(12) United States Patent
Foster et al.

(10) Patent No.: US 10,501,183 B2
(45) Date of Patent: Dec. 10, 2019

(54) MULTIPLE MISSILE AND BOMB CARRIAGE SYSTEM

(71) Applicant: The Boeing Company, Chicago, IL (US)

(72) Inventors: John K. Foster, St. Peters, MO (US); Thaddeus M. Jakubowski, St. Charles, MO (US); Ryan Binkholder, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 814 days.

(21) Appl. No.: 15/068,304

(22) Filed: Mar. 11, 2016

(65) Prior Publication Data

US 2017/0259919 A1 Sep. 14, 2017

(51) Int. Cl.
*B64D 1/04* (2006.01)
*G06F 3/00* (2006.01)

(52) U.S. Cl.
CPC .......... *B64D 1/04* (2013.01); *G06F 3/00* (2013.01)

(58) Field of Classification Search
CPC ....................................................... B64D 1/04
See application file for complete search history.

(56) References Cited

U.S. PATENT DOCUMENTS

| 5,932,829 A | 8/1999 | Jakubowski, Jr. |
| 6,655,254 B1 * | 12/2003 | Nicodemus ............. B64D 1/04 89/1.54 |
| 8,117,955 B2 * | 2/2012 | Roemerman ........... B64D 1/06 89/1.54 |

OTHER PUBLICATIONS

"Department of Defense Interface Standard: Aircraft/Store Electrical Interconnection System." MIL-STD-1760E. Oct. 24, 2007. Retrieved from www.everyspec.com. (Year: 2007).*
Butler, Amy; "With Silent Eagle Dead, Boeing Outlines F-15 Upgrade Options"; Aerospace Daily & Defense Report; Sep. 11, 2015.

* cited by examiner

*Primary Examiner* — Philip J Bonzell
*Assistant Examiner* — Michael B. Kreiner
(74) *Attorney, Agent, or Firm* — Felix L. Fischer

(57) ABSTRACT

A multiple advanced missile and bomb ejector rack carriage system employs a carriage mountable to an air to ground (AG) bomb release unit (BRU) on an aircraft pylon. A single MIL-STD-1760 electrical interface is integral to the carriage and has a first power connection and first signal connection. Onboard carriage avionics are supported within the carriage and connected to the MIL-STD-1760 electrical interface. The onboard carriage avionics are adapted to receive communications from an aircraft central computer through the first power connection and first signal connection and provide store specific communications independent of specific original aircraft wiring to at least one ejector and store.

15 Claims, 13 Drawing Sheets

MULTIPLE MISSILE AND BOMB CARRIAGE SYSTEM

BACKGROUND INFORMATION

Field

Embodiments of the disclosure relate generally to weapons carriage systems for aircraft and, more particularly, to a system for providing the ability to carry and deploy multiple air-to-air stores or air to ground stores using on-board avionics in the carriage that divides a single existing pylon signal set connected through a single generic connector to multiple weapons.

Background

Existing methods to carry multiple Air-to-Air (AA) stores at a single aircraft pylon station require that multiple signal sets be carried from the aircraft stores management system (SMS) to each of the AA stores. This means additional long electrical routing paths to the pylon station given that the SMS is centrally located on the aircraft. Additionally, this requires retrofit to existing aircraft if these additional signal sets and associated wire routing paths are not in place. Additionally, no carriage system exists that allows for integration of multiple AA or Air-to-Ground (AG) stores at a single weapon station using a common carriage structure and ejector racks.

It is therefore desirable to provide an improved carriage system having the ability to carry multiple AA or AG stores using standard mechanical and electrical interfaces without costly and time consuming modifications to a military aircraft.

SUMMARY

Exemplary embodiments provide a multiple advanced missile and bomb ejector rack carriage system having a carriage mountable to an air to ground (AG) bomb release unit (BRI) on an aircraft pylon, A single MIL-STD-1760 electrical interface is integral to the carriage and has a first power connection and first signal connection. Onboard carriage avionics are carried within the carriage and connected to the MIL-STD-1760 electrical interface. The onboard carriage avionics are adapted to receive communications from an aircraft central computer through the first power connection and first signal connection and provide store specific communications independent of specific original aircraft wiring to at least one ejector and store.

The embodiments disclosed allow a method for operational deployment of selected stores of varying configuration wherein a carriage is mounted to an aircraft pylon having an AG BRU connected through a single MIL-STD-1760 connector. Communications from an aircraft central computer are received through the single MIL-STD-1760 connector to onboard carriage avionics with store specific communications. Instructions are transmitted via a communication bus from the onboard avionics independent of specific original aircraft wiring to at least one ejector rack and the store,

BRIEF DESCRIPTION OF THE DRAWINGS

The features, functions, and advantages that have been discussed can be achieved independently in various embodiments of the present invention or may be combined in vet other embodiments further details of which can be seen with reference to the following description and drawings.

DETAILED DESCRIPTION

The embodiment described herein employs a Multiple Advanced Missile and Bomb Ejection Rack (AMBER) Carriage System which divides an existing standard electrical/mechanical interface at an aircraft pylon for communication with multiple AA or AG store types utilizing on-board carriage avionics. This requires no physical mechanical or electrical modification/retrofit to existing aircraft interfaces. Additionally, the Multiple AMBER Carriage System is configurable to accommodate multiple AA or AG stores utilizing a common carriage structure and ejector racks. Larger stores may require forward and aft staggering of the ejector racks which the Multiple AMBER Carriage System can accommodate.

Figure 1:
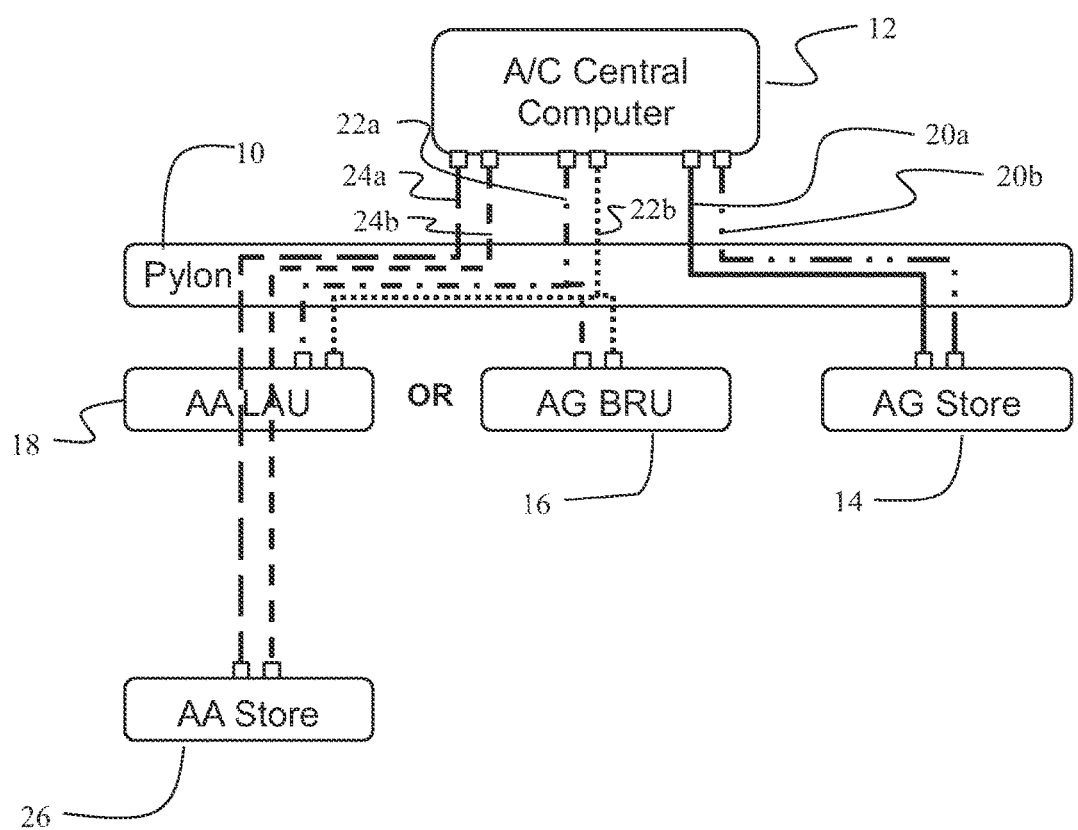
FIG. 1 is a block diagram of a typical prior art aircraft weapons store carriage system.

As seen in FIG. 1, prior art systems for carriage of weapon stores employ an aircraft pylon 10 to which electrical power and signal connections are provided from an aircraft central computer 12. Various conventional dispenser configurations are attached to pylon 10 including air to ground (AG) stores 14, AG bomb release units (BRU) 16 and air to air (AA) launcher units (LAU) 18. Communications from the aircraft central computer 12 and overall aircraft systems include a power connection 20a and signal connection 20b for basic AG stores employing a Universal Armament Interface (UAI) that is provided through a MIL-STD-1760 connector through the pylon 10 to AG store 14. A second power connection 22a and second signal connection 22b are provided through the pylon to the AG BRU 16 for AG BRU or AA BRU (an AA store with only basic communications requirements connected to the AG BRU 16). For AA stores with specialized (non UAI) power and signal requirements, a third power connection 24a and third signal connection 24b are provided to the pylon 10 which are then connected through the AA LAU 18 to a mounted AA store 26. For each new or additional type of non-UAI AA store, additional or replacement wiring for the third power and signal connections 24a, 24b must he routed through the aircraft.

Figure 2A:
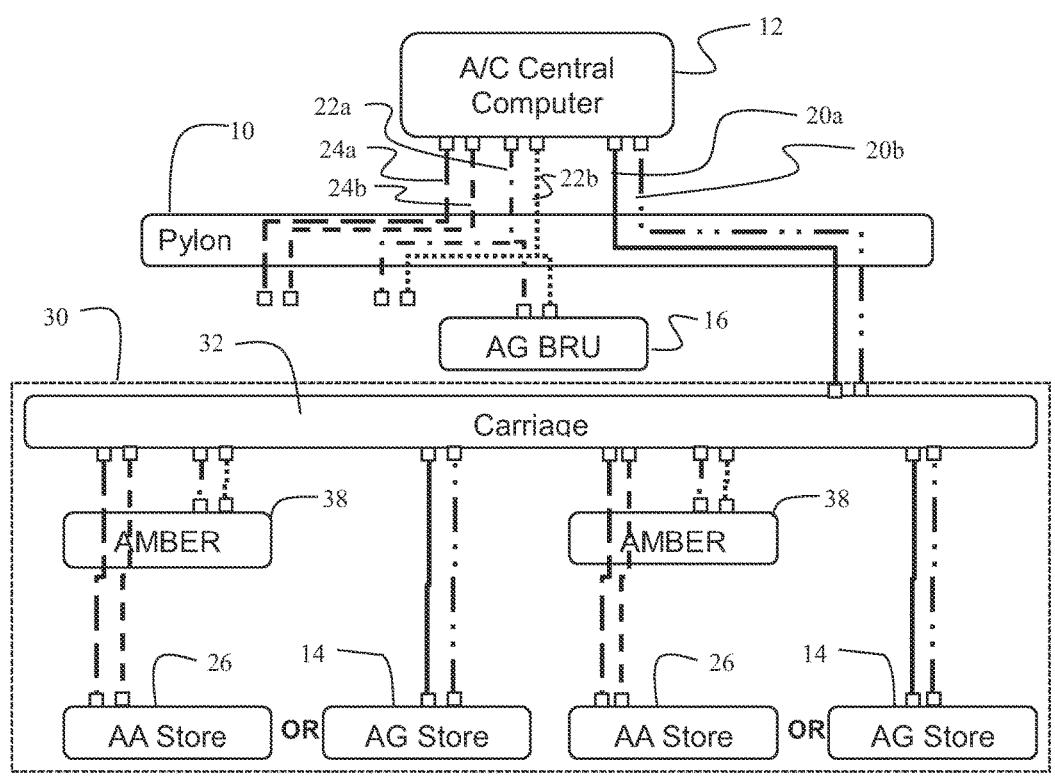
FIG. 2 is a block diagram of an exemplary embodiment of the multiple advanced missile and bomb ejector rack carriage system.
Figure 2B:
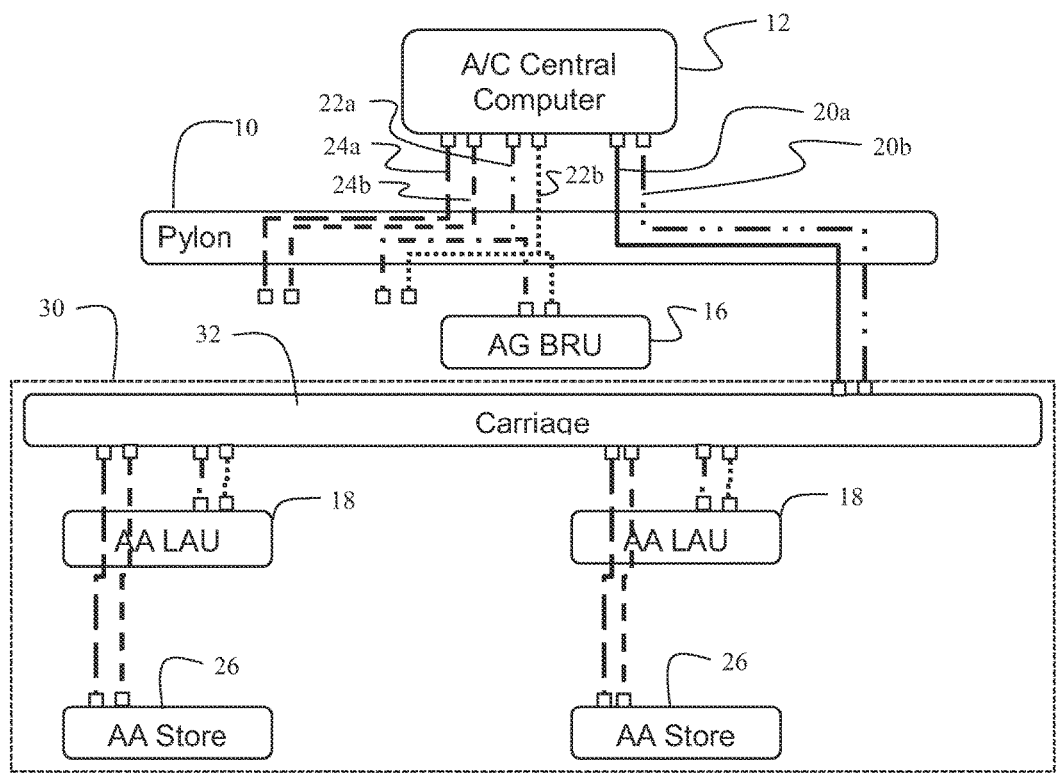
Figure 2C:
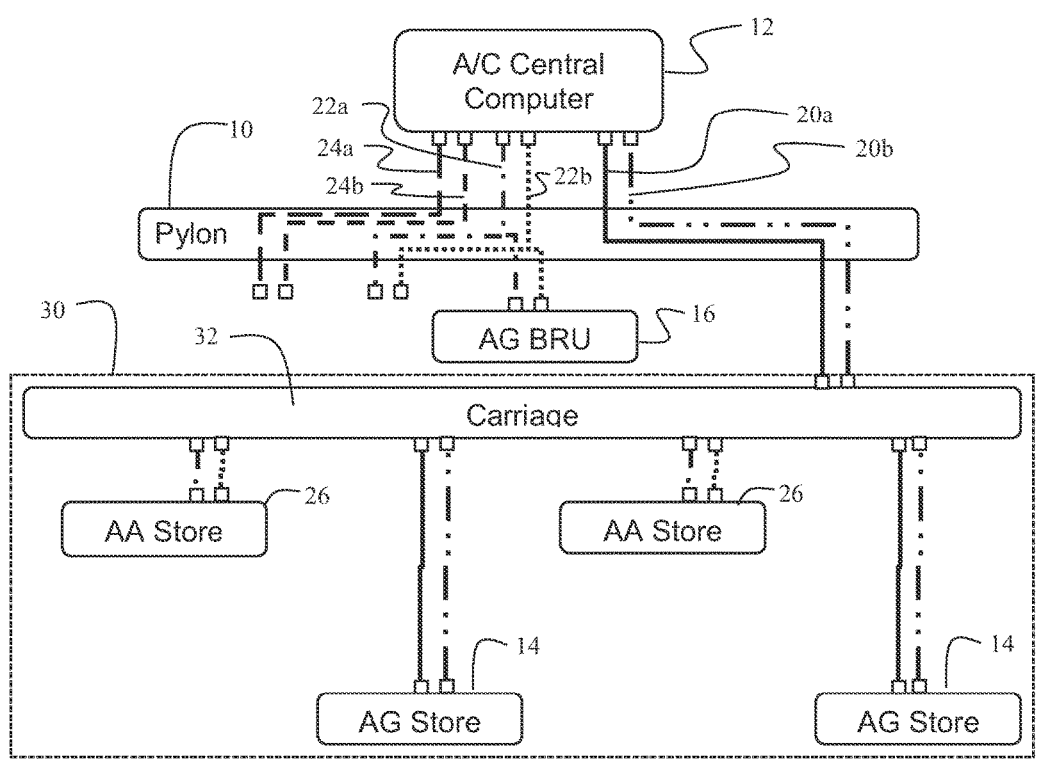

The present embodiment of the multiple AMBER carriage system 30 shown in FIGS. 2A-2C eliminates the requirement for multiple non-UAI wiring harnesses and provides increased flexibility in stores mounting to the aircraftAircraft pylon 10 is provided with electrical power and signal connections from the aircraft central computer 12. A power connection 20a and signal connection 20b are provided through the pylon 10. A second power connection 22a and second signal connection 22b are provided through the pylon 10 to the AG BRU 16. A carriage 32 for the multiple AMBER carriage system 30 mechanically interfaces with the AG BRU 16 on the pylon 10 thereby allowing retrofit of an aircraft for carrying a plurality of air to air (AA) and air to ground (AG) stores without substantial structural modification or addition of power and data wiring to the aircraft. The carriage 32 may carry AMBER ejectors 38 for either AA stores or AG stores as shown in FIG. 2A. Alternatively, as will be described subsequently, the carriage 32 may carry AA LAUs 18 for AA stores 26 compatible with the existing aircraft wiring as shown in FIG. 2B. Finally, the carriage 32 may carry AA stores 26 or AG stores 14 which are compatible with direct connection through the AG BRU 16 with AG ejectors, to be described subsequently, as seen in FIG. 2C.

Figure 3:
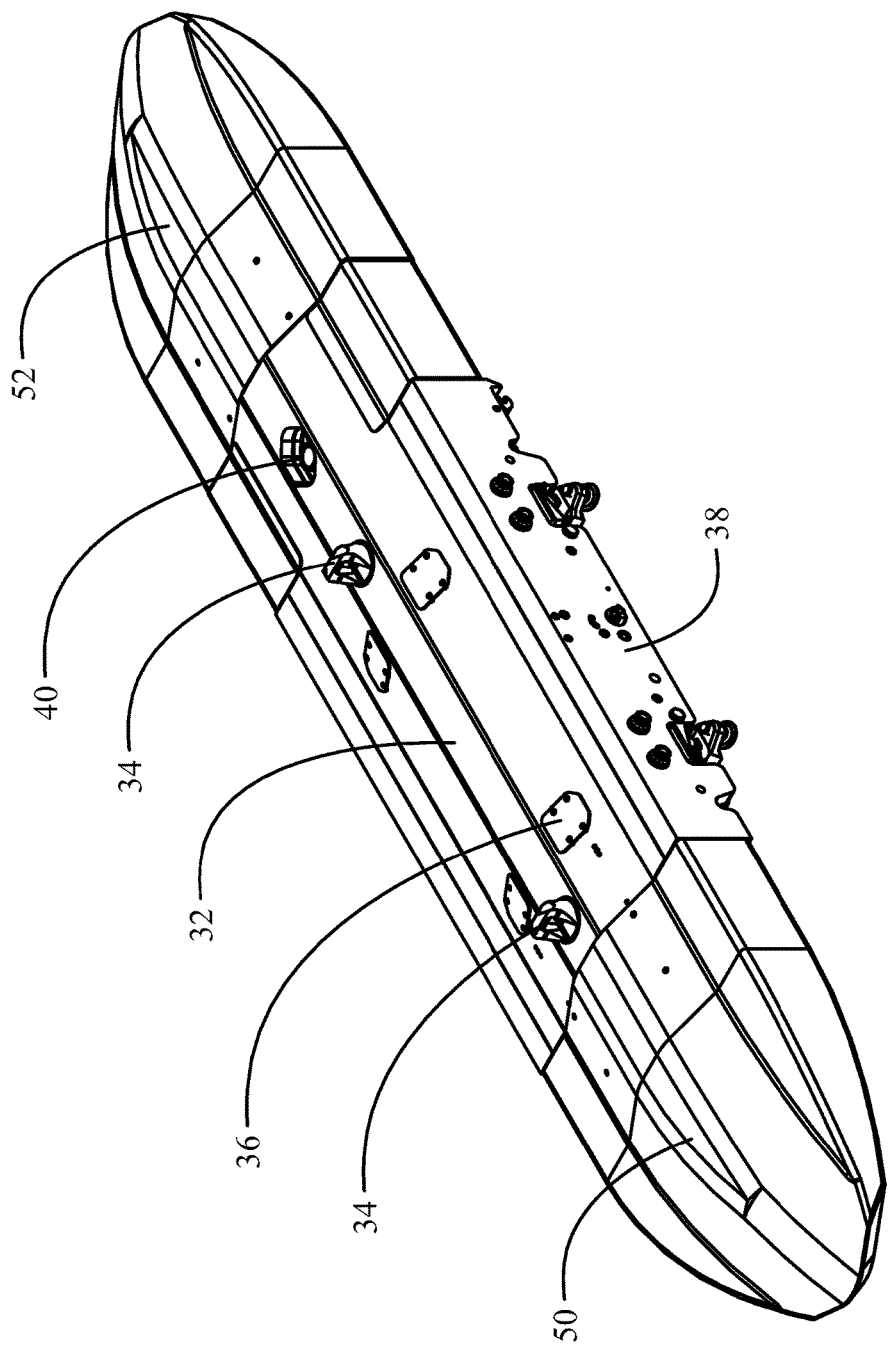
FIG. 3 is a pictorial representation of carriage for the embodiment.
Figure 4A:
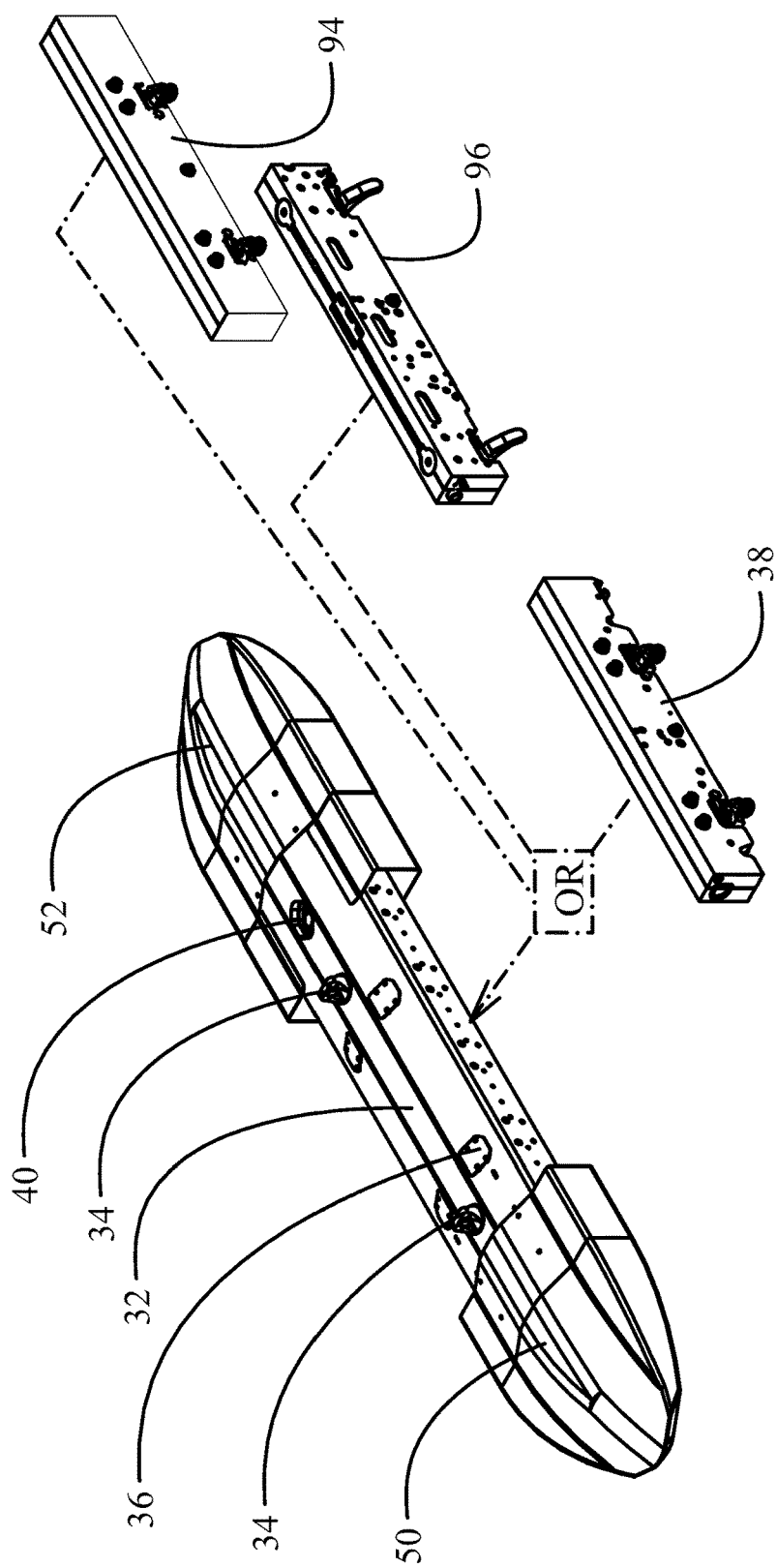
FIG. 4A is a pictorial representation of the carriage with alternative ejector racks for mounting.
Figure 4B:
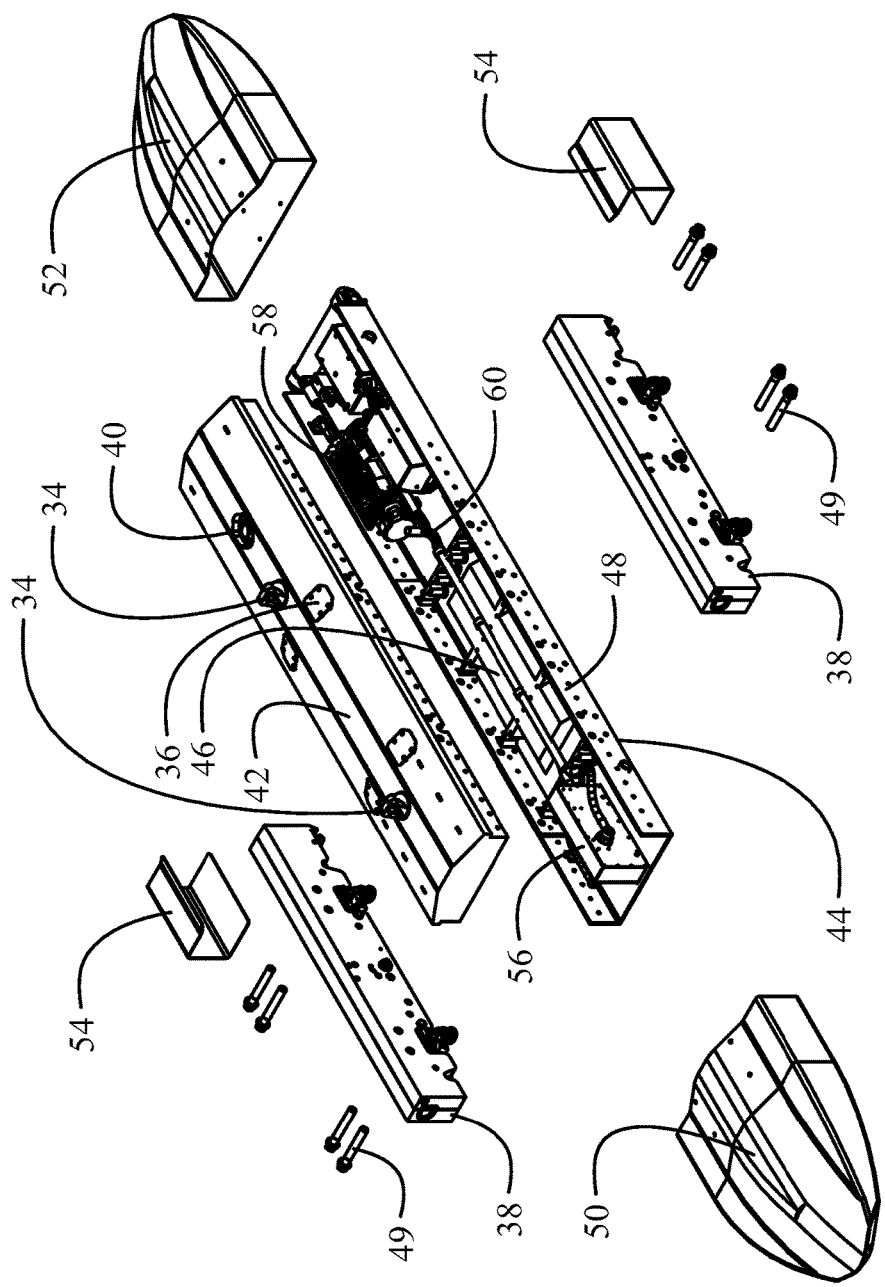
FIG. 4B is an exploded view of the carriage elements.

An exemplary physical implementation of the embodiment is shown in FIG. 3. The carriage 32 incorporates standard pylon attachment lugs 34 and sway brace pads 36 for attachment to the pylon 10. The tugs and sway braces allow mechanical coupling to the aircraft, enabling quick connect and disconnect of the carriage system to the aircraft for carrying a plurality of AA and AG stores. An AMBER ejector 38 is engaged on each side of the carriage 32 for attachment of either AA or AG stores. A MIL-STD-1760 electrical interface 40 provides electrical connection as will be described in greater detail subsequently. As seen in detail in FIGS. 4A and 4B, the carriage 32 incorporates an upper beam 42 on which the attachment lugs 34 and sway brace pads 36 are mounted. A lower beam 44 having an avionics compartment 46 is attached to the upper beam 42 and incorporates side engagement interfaces 48 to receive the AMBER ejectors 38 (or conventional ejectors as described subsequently) with standard fasteners 49. Forward fairing 50 and aft fairing 52 provide aerodynamic shaping and are attached to the forward and aft portions of the lower beam. Positionable side fairings 54 are engaged forward or aft of the AMBER ejectors 38 to allow staggering of the ejectors as will be described subsequently. As seen in FIG. 4B the avionics compartment 16 supports onboard carriage avionics 56 and a pneumatic system 58. Cable harness 60 interconnects the MIL-STD-1760 electrical interface 40 with the onboard carriage avionics 56 and pneumatic system 58.

Figure 5:
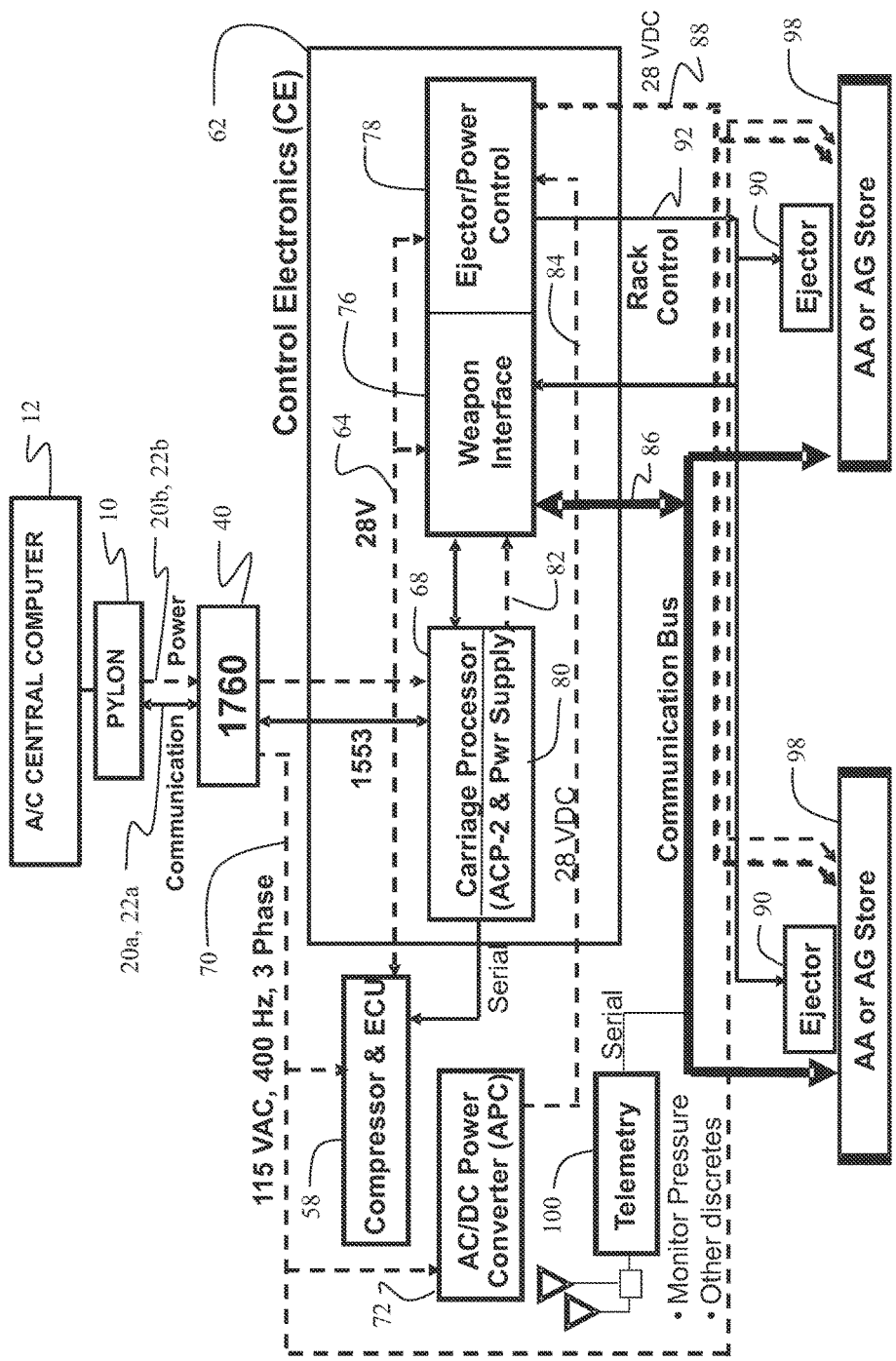
FIG. 5 is a block diagram of the integral carriage avionics and systems for communication with the ejector racks and stores; and, FIG. 6 is a flow chart showing a method for employing the embodiment for stores carriage and launch].

As seen in FIG. 5, the MIL-STD-1760 electrical interface 40 is connected for communication signals 20a, 22a and power signals 20b, 22b from the aircraft central computer 12 through the pylon 10 Control electronics 62 in the onboard carriage avionics 56 receive 28V power through first AC circuit 64 and communications signals through MIL-STD-1553 bus 66. A carriage processor 68 is connected to bus 66 to receive the communications signals. 115 VAC, 400 Hz 3 phase power is provided through second AC circuit 70 to an AC/DC Power Converter (APC) 72 and to the pneumatic system 58 which includes a compressor and ejector control unit (ECU). The carriage processor 68 communicates with a weapon interface 74 and ejector/power control 78 which both receive power from the first AC circuit 64. The carriage processor 68 integrally incorporates a second APC 80 which provides 28 VDC power through first DC circuit 82 to the weapons interface 76. Ejector/power control 78 receives 28 VDC power from APC 72 on second DC circuit 84. The weapon interface 78 provides communications from the carriage control electronics 62 through communications bus 86 which for the embodiment shown may be a portion of the 1553 bus 66. All communications whether UAI or non-UAI are provided from the aircraft central computer 12 through the MIL-STD-1760 electrical interface to the carriage processor 68 which then provides proper signaling independent of specific original aircraft wiring for whatever store may be present on the ejector. Communication through the MIL-STD01760 to the carriage processor for all signals accommodates multiple UAI or non-UAI stores without any additional wiring from the aircraft. Communications from the aircraft central computer 12 re received through the MIL-STD-1760 electrical interface 40 and the MIL-STD-1553 bus are interpreted by the carriage processor 68 and appropriate store specific signaling for the particular store carried on the ejector rack is then provided to the weapon interface 76 through the communication bus 86 to the store. Changes to the store are then accommodated by software changes in the carriage processor 68 without any wiring changes to the aircraft or pylon. Additionally the carriage processor 68 and weapon interface 76 with close proximity and direct attachment to the AA store may accommodate an additional AA interface layer to meet tight clock error tolerance with respect missile clock errors. The ejector power control 78 provides 28 VDC power to the AA or AG Store on weapon power circuit 88 while 115 VAC, 400 Hz, 3 Phase power is provided by the second AC circuit 70. Additionally, ejector/power control 78 provides control signals to the ejectors 90 through ejection control circuit 92 with feedback to the weapon interface 76. Each ejector 90 may comprise an AMBER ejector 38 as seen in FIG. 4A or a standard AG ejector rack 94 or AA ejector rack 96 which are interchangeably mounted to the side engagement interfaces 48 on the carriage 32 thereby accommodating any desired AA or AG store 98. A telemetry system 100 transmits pressure data and other discrete parameters through the communication bus 86 to the stores 98. As reflected in FIG. 2, an AMBER ejector 38 may accommodate either an AA store 26 or an AG store 14. Alternatively as discussed with respect to FIG. 4A the carriage 32 may carry the standard AG rack 94 to accommodate an AG store 14 and a standard AA ejector rack 96 which may be an AA LAU 18 which is configured to accommodate the third signal and power connections 24a and 24b already present in the aircraft pylon 10. The AA ejector rack 96 when connected to the carriage 32 may alternatively provide signaling to an AA store 26 directly through the AG BRU 16.

Figure 4C:
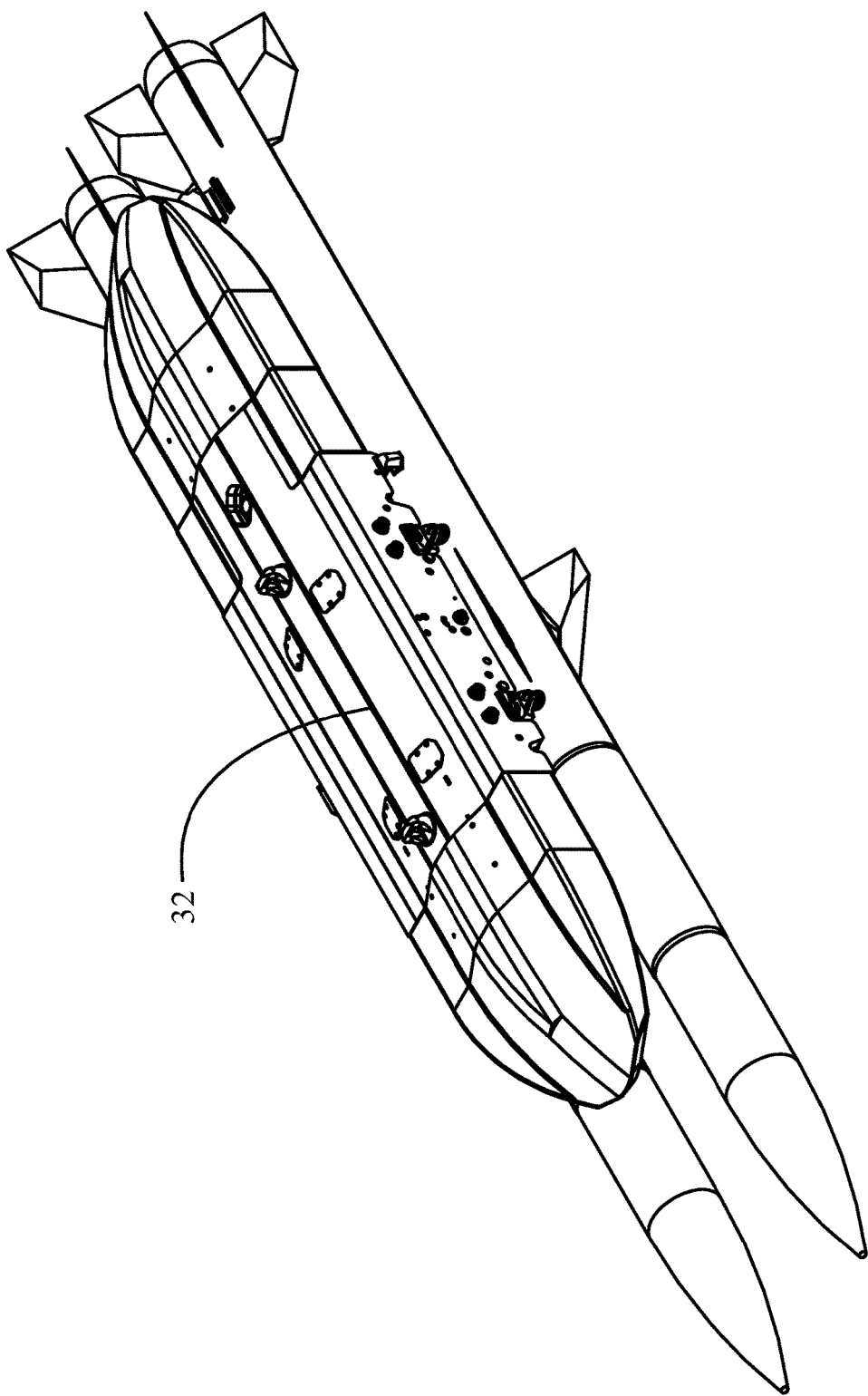
FIG. 4C is a pictorial representation of the carriage with an exemplary AA store set.
Figure 4D:
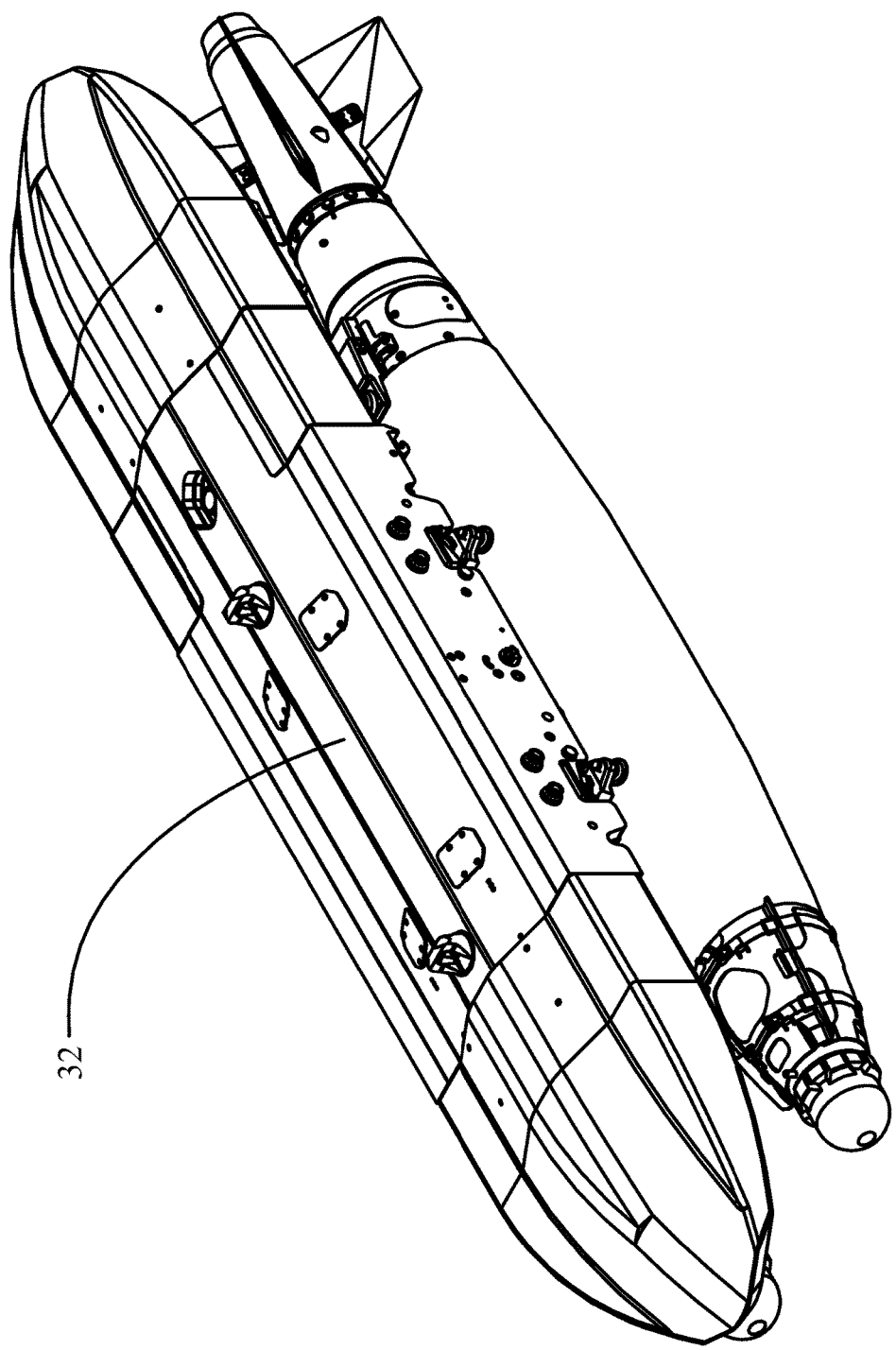
FIG. 4D is a pictorial representation of the carriage with an exemplary first AG store set.
Figure 4E:
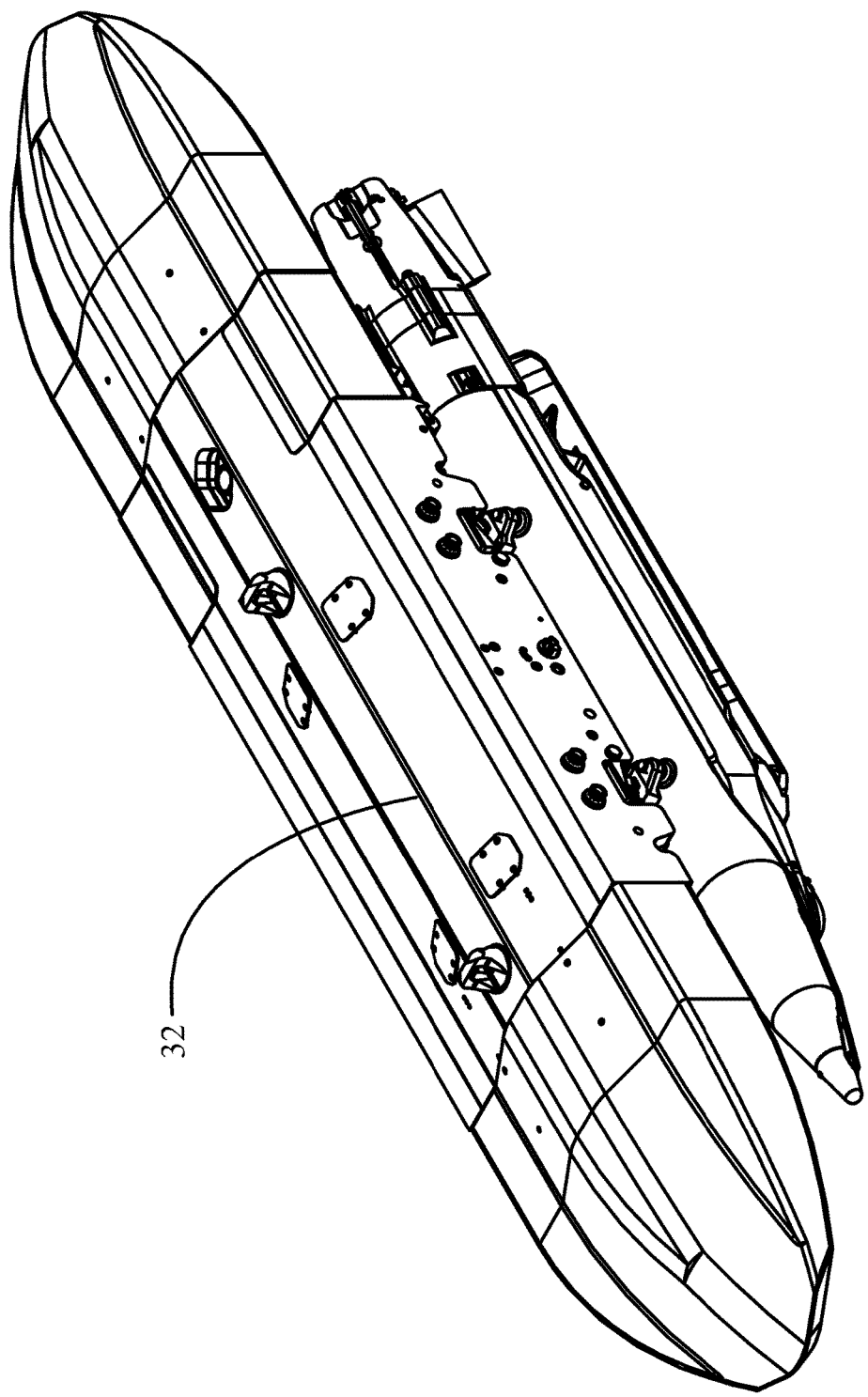
FIG. 4E is a pictorial representation of the carriage with a second exemplary AG store set.
Figure 4F:
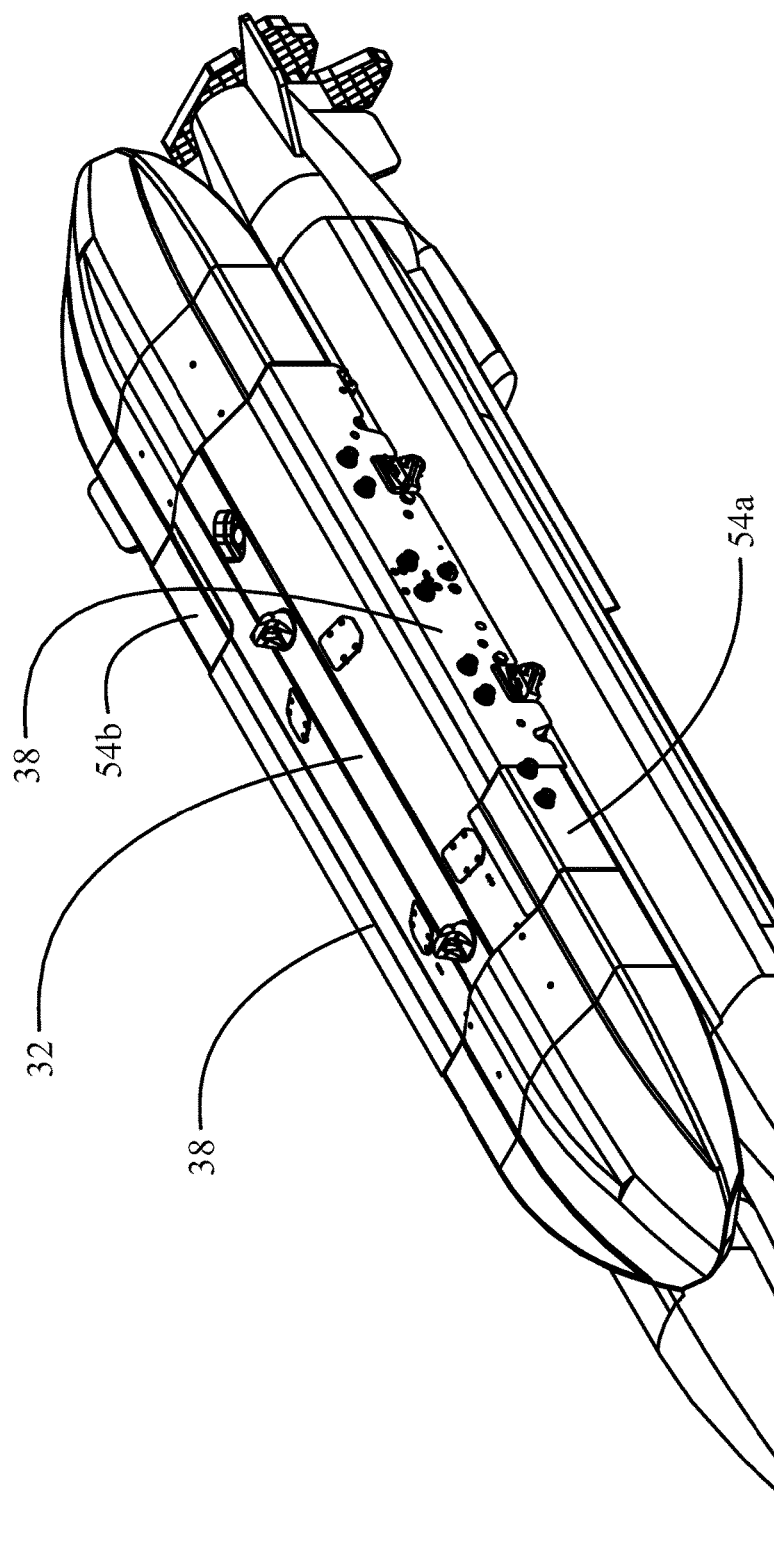
FIG. 4F is a pictorial representation of the carriage with an exemplary air launched decoy store set with staggered mounting.

As seen in FIG. 4C, 4D and 4E, the weapons carried by the AMBER ejector 38 or store optimized racks such as AA ejector rack 96 or AG ejector rack 94 connected to the carriage 32 may include multiple Advanced Medium-Range Air-to-Air Missiles (AMRAAM), as an exemplary AA store, 500 lbs Joint Direct Attack Munitions (JDAM) or multiple small diameter bombs (SDB), as an exemplary AG store. By configuring one side of the carriage 32 with a first side fairing 54a located forward and the second side fairing 54b located aft to adjust the position of the AMBER ejectors 38, as shown in FIG. 4F, larger stores such as multiple miniature air launched decoys (MALD) may be mounted in a staggered configuration.

Figure 6:
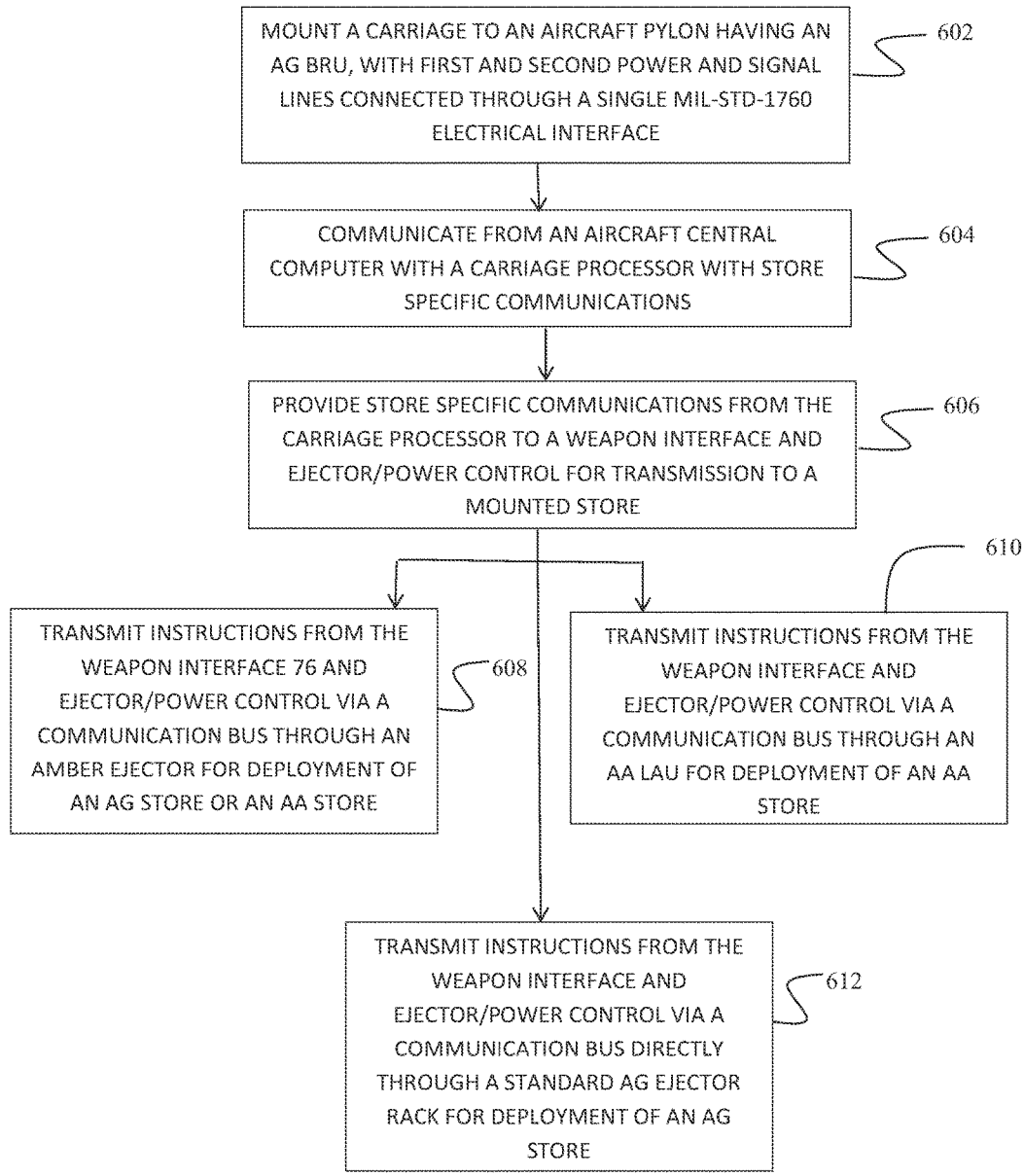

FIG. 6 shows a method for operational deployment of selected stores of varying configuration using a multiple AMBER carriage system. A carriage 32 is mounted to an aircraft pylon 10 having an AG BRU, with first and second power and signal lines 20a, 20b, 22a, 22b connected through a single MIL-STD-1760 electrical interface 40, step 602. An aircraft central computer 12 communicates with a carriage processor 68 with store specific communications, step 604. The carriage processor 68 provides store specific communications to a weapon interface 76 and ejector/power control 78 for transmission to a mounted store, step 606. The weapon interface 76 and ejector/power control 78 transmit instructions via a communication bus 86 through an AMBER ejector 38 for deployment of an AG store 14 or an AA store 26, step 608. The weapon interface 76 and ejector/power control 78 alternatively transmit instructions via a communication bus 86 through an AA LAU 1.8 for deployment of an AA store, step 610. The weapon interface 76 and ejector/power control 78 alternatively transmit instructions via a communication bus 86 from the AG BRU 16 directly through a standard AA ejector rack 96 for deployment of an AA store 26, step 612, or directly through a standard AG ejector rack 94 for deployment of an AG store 14, step 614.

Having now described various embodiments of the invention in detail as required by the patent statutes, those skilled in the art will recognize modifications and substitutions to the specific embodiments disclosed herein. Such modifications are within the scope and intent of the present disclosure as defined in the following claims.

What is claimed is:

1. A multiple advanced missile and bomb ejector rack carriage system comprising:
    a carriage having
    an upper beam on which attachments lugs and sway brace pads are mounted;
    a lower beam having an avionics compartment, said lower beam attached to the upper beam and incorporating side engagement interfaces to receive the at least one ejector;
    a forward fairing attached to a forward portion of the lower beam; and,
    an aft fairing attached to an aft portion of the lower beam; and
    side fairings positionally engaged forward or aft of the first ejector and second ejector to allow staggering;
    said carriage mountable to an air to ground (AG) bomb release unit (BRU) on an aircraft pylon;
    a single MIL-STD-1760 electrical interface integral to the carriage having at least a first power connection and at least a first signal connection;
    onboard carriage avionics supported within the carriage and connected to the MIL-STD-1760 electrical interface, said onboard carriage avionics adapted to receive communications from an aircraft central computer through the at least a first power connection and at least a first signal connection and provide store specific communications to a first ejector and a second ejector each with a store.

2. The multiple advanced missile and bomb ejector rack carriage system as defined in claim 1 wherein the at least one ejector comprises an advanced missile and bomb ejection rack (AMBER) and the store is selected from the set of universal armament interface (UAI) air to air (AA) stores, non-UAI AA stores, and air to ground (AG) stores.

3. The multiple advanced missile and bomb ejector rack carriage system as defined in claim 1 wherein the at least one ejector comprises an AA launcher (LAU).

4. The multiple advanced missile and bomb ejector rack carriage system as defined in claim 1 wherein the at least one ejector comprises an AG ejector (BRU).

5. The multiple advanced missile and bomb ejector rack carriage system as defined in claim 1 wherein the onboard carriage avionics comprise control electronics receiving 28V power through a first AC circuit and communications signals through a MIL-STD-1553 bus and further comprising a first AC/DC power converter (APC) receiving 115VAC, 400 HZ, 3 phase power on a second AC circuit.

6. The multiple advanced missile and bomb ejector rack carriage system as defined in claim 5 wherein the control electronics comprise:
    a carriage processor communicating with a weapon interface and an ejector/power control, said weapon interface and ejector/power control receiving power from the first AC circuit;
    a second APC integral to the carriage processor and providing 28VDC power through a first DC circuit to the weapons interface, said ejector/power control receiving 28VDC power from the first APC on a second DC circuit, the weapon interface providing communications from the control electronics through a communications bus to the at least one ejector and store and the ejector/power control providing 28VDC power through a weapon power circuit to the at least one ejector and store.

7. The multiple advanced missile and bomb ejector rack carriage system as defined in claim 6 further comprising a telemetry system connected to provide telemetry signals through the communication bus to the at least one ejector and store.

8. The multiple advanced missile and bomb ejector rack carriage system as defined in claim 1 wherein the at least one ejector rack comprises at least one store optimized rack and wherein the store is selected from the set of Advanced Medium-Range Air-to-Air Missiles (AMRAAM), 500 lbs Joint Direct Attack Munitions (JDAM), multiple small diameter bombs (SDB) and multiple miniature air launched decoys (MALD).

9. A method for operational deployment of selected stores of varying configuration comprising:
    mounting a carriage having an upper beam on which attachment lugs and sway brace pads are mounted, a lower beam having an avionics compartment, said lower beam attached to the upper beam and incorporating side engagement interfaces to receive the at least one ejector, a forward fairing attached to a forward portion of the lower beam and an aft fairing attached to an aft portion of the lower beam, and side fairings positionally engaged forward or aft of the first ejector and second ejector to allow staggering, to an aircraft pylon having an AG BRU connected through a single MIL-STD-1760 connector integral to the carriage having at least a first power connection and at least a first signal connection;
    communicating from an aircraft central computer to onboard carriage avionics, supported within the carriage and connected to the MIL-STD-1760 electrical interface, with store specific communications, said onboard carriage avionics adapted to receive communications from an aircraft central computer through the at least a first power connection and at least a first signal connection; and
    transmitting instructions via a communication bus from the onboard carriage avionics independent of specific original aircraft wiring to a first ejector and a second ejector each with a mounted store.

10. A method for operational deployment of selected stores of varying configuration comprising 9 wherein the step of communicating from an aircraft central computer comprises communicating to a carriage processor, and providing store specific communications from the carriage processor to a weapon interface and ejector/power control for transmission to each mounted store;

and the step of transmitting comprises transmitting instructions from the weapon interface and ejector/power control to one of the first and second ejector and the mounted store.

11. The method for operational deployment of selected stores of varying configuration of claim 10 wherein the at least one ejector rack comprises an AMBER ejector rack adapted for deployment of an AG store or an AA store.

12. The method for operational deployment of selected stores of varying configuration of claim 10 wherein the weapon interface and ejector/power control transmit instructions via a communication bus through an AA LAU for deployment of an AA store.

13. The method for operational deployment of selected stores of varying configuration of claim 10 wherein the weapon interface and ejector/power control transmit instructions via a communication bus from the AG BRU directly through an AA ejector rack for deployment of an AA store.

14. The method for operational deployment of selected stores of varying configuration of claim 10 via a communication bus from the AG BRU directly through a standard AG ejector rack for deployment of an AG store.

15. The method for operational deployment of selected stores of varying configuration of claim 10 wherein the step of communicating further comprises providing a first power connection, first signal connection, second power connection and second signal connection from the aircraft central computer through the single MIL-STD-1760 electrical interface to provide store specific communications.

* * * * *